United States Patent
Kobold

Patent Number: 5,816,448
Date of Patent: Oct. 6, 1998

[54] DOSING DEVICE AND SYSTEM FOR ACCURATE DOSING OF FLUIDS

[76] Inventor: Klaus Kobold, Prinsenbeemdaan 1, B-1860, Meise, Belgium

[21] Appl. No.: 592,344
[22] PCT Filed: May 6, 1994
[86] PCT No.: PCT/EP94/01436
§ 371 Date: Feb. 7, 1996
§ 102(e) Date: Feb. 7, 1996
[87] PCT Pub. No.: WO95/16229
PCT Pub. Date: Jun. 15, 1995

[30] Foreign Application Priority Data

Dec. 9, 1993 [DE] Germany ............ 43 42 096.6

[51] Int. Cl.$^6$ .................................................. B67D 5/22
[52] U.S. Cl. ............................. 222/36; 222/40; 222/59; 222/71
[58] Field of Search ................. 222/36, 40, 59, 222/71

[56] References Cited

U.S. PATENT DOCUMENTS

| | | | |
|---|---|---|---|
| 3,386,620 | 6/1968 | Smith | 222/20 |
| 4,134,423 | 1/1979 | Mayer | 137/486 |
| 4,199,003 | 4/1980 | Goldsmith | 137/467.5 |
| 4,800,492 | 1/1989 | Johnson et al. | 222/71 X |
| 5,054,650 | 10/1991 | Price | 222/71 X |
| 5,086,806 | 2/1992 | Engler et al. | 137/486 |
| 5,192,000 | 3/1993 | Wandrick et al. | 222/59 |

FOREIGN PATENT DOCUMENTS

| | | |
|---|---|---|
| 0 385 501 | 9/1990 | European Pat. Off. |
| 2 685 475 | 6/1993 | France |
| 23 44 850 | 3/1975 | Germany |
| 30 50 395 | 11/1982 | Germany |
| 2 222 264 | 2/1990 | United Kingdom |
| 2 262 934 | 7/1993 | United Kingdom |
| 2 265 357 | 9/1993 | United Kingdom |

OTHER PUBLICATIONS

Patent Abstracts of Japan, vol. 9, No. 9 (P–327) 16 Jan. 1985 & JP,A,59 159 019 (Nakamura Kinzoku Kogyosho) 8 Sep. 1984, see abstract.

*Primary Examiner*—Joseph Kaufman
*Attorney, Agent, or Firm*—Wenderoth, Lind & Ponack, L.L.P.

[57] ABSTRACT

An arrangement for dosing fluids, such as beverages, comprising a flow meter arranged in the fluid dosing duct, an on-off valve arranged in the dosing duct downstream of the flow meter for releasing or cutting the flow of fluid, and an evaluation circuit that transmits a switching off control signal (closing signal) to the on-off valve when a predetermined amount of fluid has passed through the flow meter. The flow meter and on-off valve are preferably an impeller flow meter and an electrically actuable on-off valve, respectively. In order to improve the dosing accuracy, a sensor is provided with the flow meter for sensing the speed of flow given, for example, by the frequency of rotation of the impeller and for supplying, to the evaluation circuit, a preferably electric sensor signal that corresponds to the speed of flow. The evaluation circuit supplies a preferably electric switching off signal to the on-off valve when the sensor signal either falls below a predetermined lower value or exceeds a predetermined upper value. Also disclosed is a beverage dispensing system provided with such a dosing arrangement.

15 Claims, 2 Drawing Sheets

DOSING DEVICE AND SYSTEM FOR ACCURATE DOSING OF FLUIDS

BACKGROUND OF THE INVENTION

This invention relates to a system and device for dosing fluids, such as beverages, with a flow meter, such as an impeller flow meter, which is disposed in the dosing line with an electrically actuatable on-off valve, disposed in the dosing line downstream of the flow meter, used for dispensing or shutting off the fluid flow. An electric evaluation circuit is also used for outputting a switch-off signal (closing signal) to the on-off valve if a given flow quantity has passed through the flow meter.

Such known dosing devices have a low dosing accuracy. In particular when dosing beverages, for example when dispensing beverages at counters, higher dosing accuracies are required. Conventional flow meters, such as impeller, turbine or similar flow meters implementing rotation which are preferably used in connection with the present invention, typically have physical properties which lead to production and operation-dependent inaccuracies of the dosing. As a rule, the inaccuracies are a function of the structure of the flow meter itself, the properties of the fluid to be dosed, and the operating conditions. They can be traced back to friction, inertia, viscosity, flow control, flow rate, turbulences and the like. Errors due to fabrication tolerances of the order of magnitude of approximately ±5% are added to the system-dependent measuring errors.

SUMMARY OF THE INVENTION

The present invention addresses the afore-mentioned problems by providing a dosing system and device with which higher dosing accuracies can be achieved.

The dosing system and device according to the present invention includes a sensor which senses the flow rate, e.g. given by the rotational frequency of the impeller, and transmits an electric sensor signal, corresponding to the flow rate, to the evaluation circuit and the evaluation circuit thereby supplies, to an on-off value, an electric switch-off signal (closing signal) if the sensor signal falls below a predetermined lower value or exceeds a predetermined upper value.

The dosing system and device of the present invention operates such that the on-off valve is kept open only if the flow meter operates within a given flow rate range. By defining the lower value and the upper value of this flow rate range, operation of the dosing device can take place such that an error curve will have minimal deviations from value 0. In contrast, if the flow rate falls below a given minimum value, or if it exceeds a given maximum value, the on-off valve is automatically closed. This allows closure of the on-off valve such that no fluid can be dispensed in ranges of the flow rate in which the dosing error would become too great. As a result, the operation-dependent dosing error can be significantly lowered compared to conventional dosing devices. Furthermore, the present invention also ensures that in the presence of foam, gas or air bubble formation, defect of the flow meter or the like, the dosing process is terminated since under such conditions the sensor signal representing the flow rate would fall under the given value and the on-off valve would be closed immediately to avoid the further dispensing of the fluid to be dosed. By way of example, the dosing process is cut off if the line between the flow meter and evaluation circuit is interrupted since, under this condition, a sensor signal within the given range can no longer be detected in the evaluation circuit. In the event of a power failure which could impair the accuracy of the dosing, the operation is interrupted. The use of flow meters comprising an impeller, turbine or similar element which is set into rotation by the streaming fluid is therefore of special interest within the scope of the invention because such flow meters can acquire a frequency signal to be used as a sensor signal in which the frequency is a measure of the flow rate of the fluid to be dosed. Thus, it is readily possible to determine, on the basis of the frequency, whether or not the rate has fallen below, or has exceeded, the predetermined limit values for the flow rate range.

In addition to excluding or decreasing of the operation-dependent dosing errors, system-dependent dosing errors can be excluded in another embodiment of the present invention in which the evaluation circuit is used with a correction value setter for a flow calibration of the particular dosing device. By implementing the correction value setter, the present invention can ensure that the evaluation circuit, which detects the signal from the flow meter for determining the desired flow quantity and upon reaching the predetermined flow quantity, sends a switch-off control signal to the on-off valve in order to close it. This switch-off control signal is outputted as many times as needed at the precise point in time at which the desired fluid quantity has passed through the flow meter. This is, for example, of significance when dispensing beverages since the dosing accuracy during dispensing of beverage fluids into a glass can be determined very accurately using the correction value setter.

The present invention further implements a counter which can be used with the evaluation circuit for keeping track of the number of dosing procedures. Thus, for example in a beverage dispensing system, the number of glasses which have been dispensed can be counted.

The dosing system and device according to the present invention also includes a start button, for use with the evaluation circuit, upon the actuation of which the onset of the fluid flow, i.e. the opening of the on-off value, is triggered. For example, by actuating the start button an electric signal is supplied to the evaluation circuit and the evaluation circuit supplies an opening signal to the on-off valve. This opening signal subsequently vanishes under the conditions described above such as, for example, if the desired fluid quantity has been dispensed or the flow rate has fallen below or has exceeded the predetermined limit values. Consequently, the dosing process is terminated when the dosing accuracy is too low or if other disturbances are present in the dosing system.

The dosing device according to the present invention is particularly advantageous in beverage dispensing systems commonly used in restaurants since such systems, as a result of having different viscosity properties of liquids to be dispensed, require high dosing accuracy. When applying the present invention to such systems, components otherwise necessary in dispensing facilities can be omitted, such as a foam detector, a pump control, a pump pressure monitor and the associated electronics.

BRIEF DESCRIPTION OF THE DRAWINGS

The present invention will be more fully understood from the detailed description below when read in connection with the accompanying drawings wherein.

DETAILED DESCRIPTION OF THE PREFERRED EMBODIMENT

Figure 1:
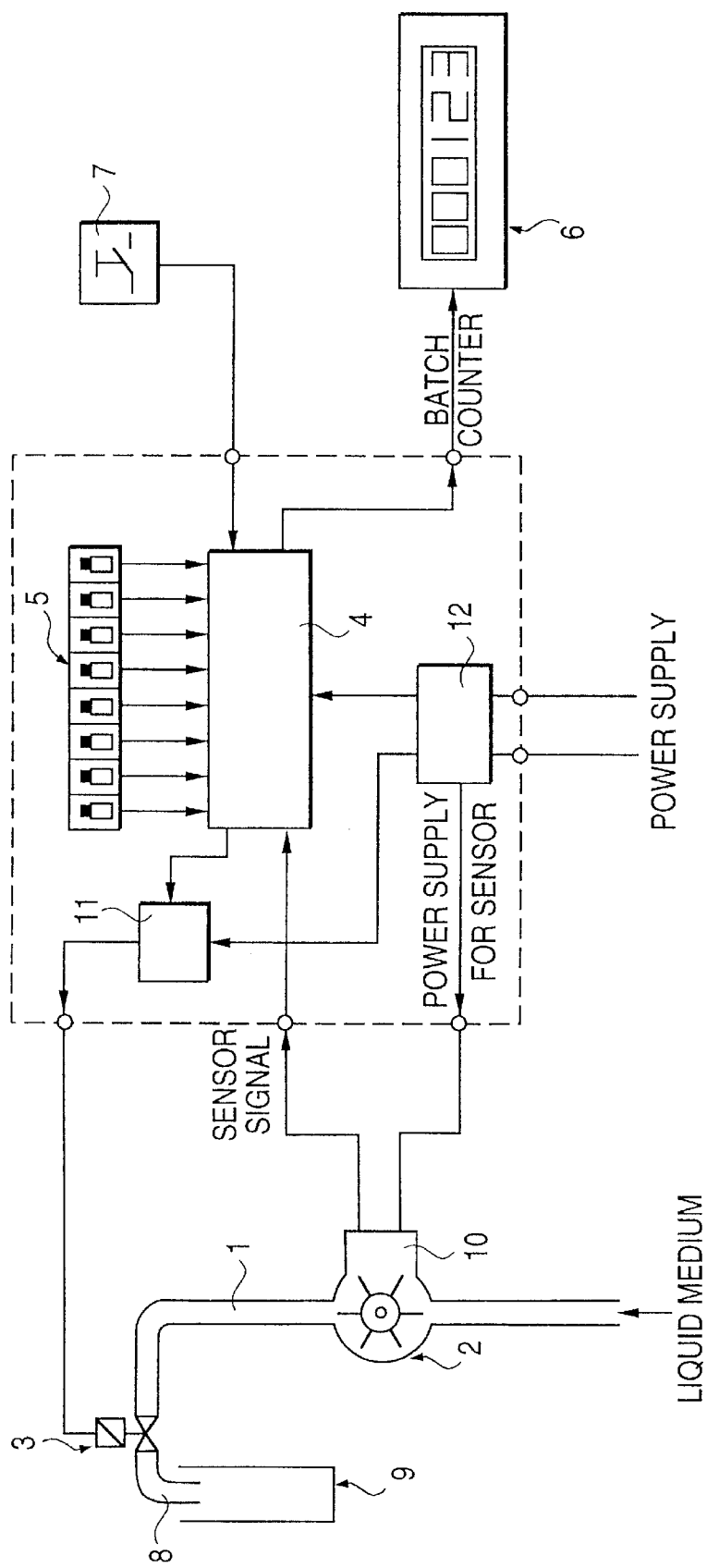
FIG. 1 is a schematic diagram of the dosing device of the present invention.
Figure 2:
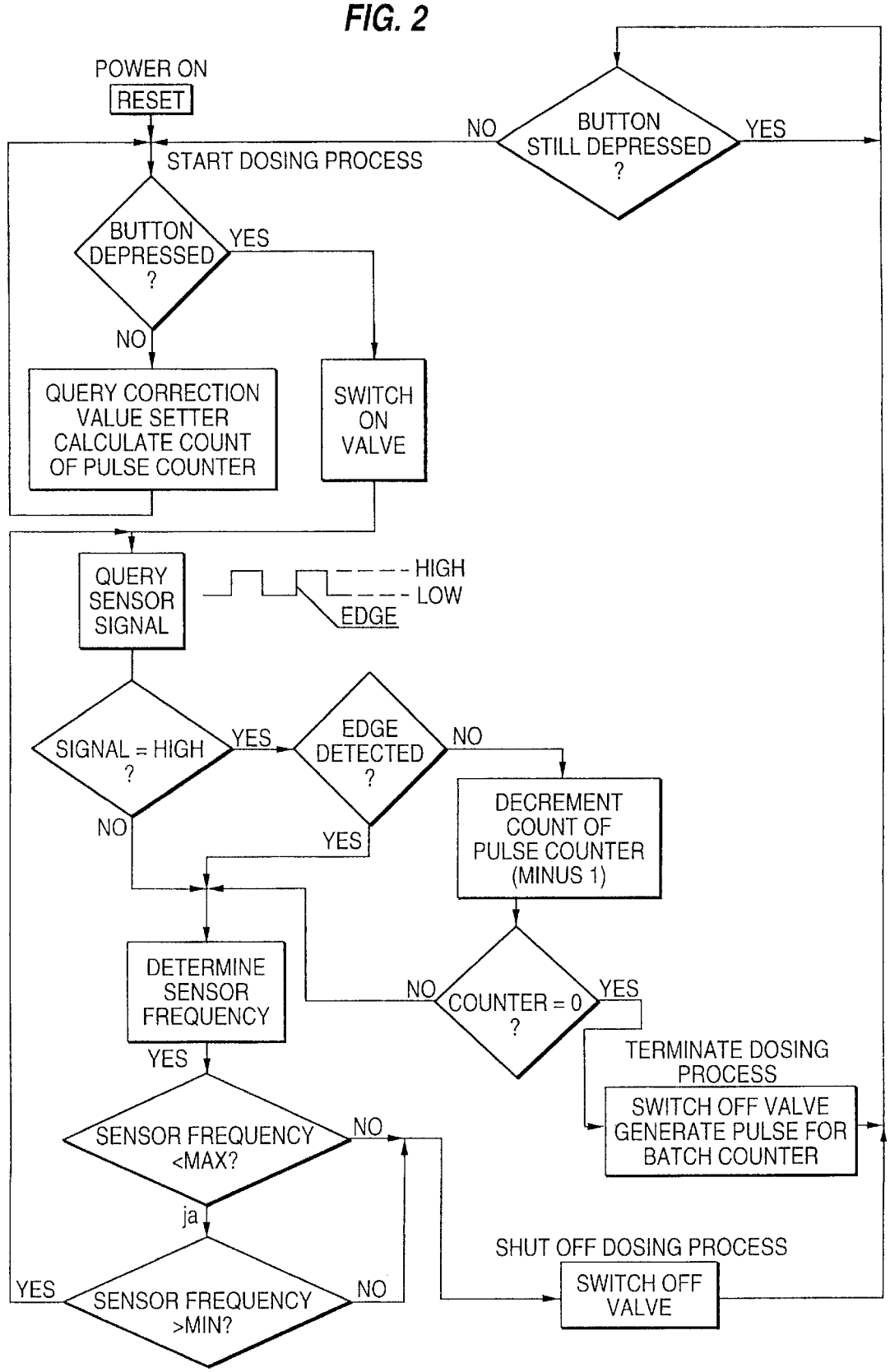
FIG. 2 is a flow chart for describing the operation of the dosing device depicted in FIG. 1.

The dosing system and device for fluids, supplied with power via an AC-DC converter 12, according to FIG. 1 comprises a flow meter 2 which is disposed in the dosing line 1. It is noted that the flow meter shown is an impeller flow meter, however, it should be appreciated that any other type of flow meter could be used. The dosing line 1 terminates near an on-off valve 3, for example implemented as solenoid valve, in an outlet 8 for dispensing the fluid, for example a liquid medium such as a beverage liquid, into a vessel 9 such as a beer glass.

A sensor is provided at or near the flow meter 2 for measuring the flow rate of the fluid. The sensor 10 outputs a sensor signal which is representative of the flow rate in the flow meter 2. In the case where an impeller flow meter is used, the sensor signal is a frequency signal with the frequency being a measure of the flow rate. The sensor 10 can, for example, be of an electro-optic or electromagnetic nature. In the case of an impeller flow meter as shown in FIG. 1, the sensor must be capable of determining the rotational frequency of the impeller and of supplying a corresponding sensor signal.

The sensor signal is supplied to an electric evaluation circuit 4 or evaluation means. Also associated with the electric evaluation circuit 4 is a start button 7 or activation means. Upon pressing the start button 7, the evaluation circuit 4, via a switching amplifier 11, outputs a signal (opening signal) to the on-off valve 3 such that the valve is opened. When the fluid is supplied under pressure, it accordingly streams in the dosing line 1 through the flow meter 2, and the on-off valve 3 which is open to the output 8 into the vessel 9. At predetermined small time intervals beginning from the actuation of the start button 7, the evaluation circuit 4 checks whether or not the sensor signal is above a lower limit value, or below an upper limit value, for the flow rate of the fluid in the flow meter 2. For example, if, in the represented case of an impeller flow meter, the frequency of the sensor signal is below a given lower limit frequency or above a given upper limit frequency, the opening signal present at the on-off valve 3 is interrupted and the on-off valve 3 is closed. This ensures that dosing occurs only in a given flow rate range and error sources, which can occur due to operation outside of this range, are excluded.

Furthermore, independent from this evaluation of the sensor signal with respect to the determined flow rate, it is understood that the sensor signal is evaluated with respect to the flow quantity. Thus, in the case shown, the number of oscillations of the sensor signal, in the form of a frequency signal, is counted and upon reaching a given value, corresponding to the fluid quantity to be dosed, the opening signal at the on-off valve 3 from the evaluation circuit 4 is interrupted.

In order to increase the dosing accuracy by excluding system-dependent errors, for example errors dependent on the dosing device, the evaluation circuit 4 is used with a correction value setter 5 or setting means which has a number of DIP switches. Each dosing device is precisely calibrated, for a particular fluid quantity to be dispensed, using this correction value setter 5.

What is claimed is:

1. A fluid dosing system comprising:
   a dosing line through which is to pass a stream of fluid;
   an on-off valve disposed in said line to open and close dosing of the fluid therefrom;
   a flow meter disposed in said dosing line at a position upstream of said valve for indicating a flow rate of fluid passing through said line;
   a sensor operable to detect the flow rate indicated by said flow meter and to generate a signal representative thereof; and
   evaluation means operably connected to said sensor for receiving said signal therefrom and operably connected to said valve for closing said valve when said signal falls below a predetermined lower value or exceeds a predetermined upper value.

2. A system as claimed in claim 1, wherein said flow meter includes a member which is movable in response to a flow of the fluid through said line, and wherein said sensor includes means for detecting movement of said member and for generating said signal as a function thereof.

3. A system as claimed in claim 1, further comprising an activation means operably connected to said evaluation means for opening said valve.

4. A system as claimed in claim 1, wherein said on-off valve is electrically actuatable.

5. A system as claimed in claim 1, wherein said evaluation means includes means for determining, based on said signal, a quantity of fluid that has passed through said flow meter and for closing said valve when the thus determined quantity has reached a predetermined value.

6. A system as claimed in claim 5, further comprising a counting means operably connected to said evaluation means for counting a number of times said predetermined value has been reached.

7. A system as claimed in claim 5, further comprising a setting means operably connected to said evaluation means for setting said predetermined value.

8. A system as claimed in claim 7, wherein said setting means comprises at least one DIP switch.

9. A fluid dosing device to be employed in a fluid dosing system wherein a fluid to be dosed passes through a dosing line having therein an on-off valve to open or close dosing of the fluid therefrom and a flow meter at a position upstream from the valve for indicating a flow rate of the fluid passing through the line, said device comprising:
   a sensor operable so as to detect the flow rate indicated by the flow meter and so as to generate a signal representative thereof; and
   evaluation means operably connected to said sensor for receiving said signal therefrom and to be operably connected to the valve for closing the valve when said signal falls below a predetermined lower value or exceeds a predetermined upper value.

10. A device as claimed in claim 9, wherein the flow meter includes a member which is movable in response to a flow of the fluid through the line, and wherein said sensor includes means for detecting movement of the member and for generating said signal as a function thereof.

11. A device as claimed in claim 9, further comprising an activation means operably connected to said evaluation means for opening the valve.

12. A device as claimed in claim 9, wherein said evaluation means includes means for determining, based on said signal, a quantity of fluid that has passed through the flow meter and for closing the valve when the thus determined quantity has reached a predetermined value.

13. A device as claimed in claim 12, further comprising a counting means operably connected to said evaluation means for counting a number of times said predetermined value has been reached.

14. A device as claimed in claim 12, further comprising a setting means operably connected to said evaluation means for setting said predetermined value.

15. A device as claimed in claim 14, wherein said setting means comprises at least one DIP switch.

* * * * *